June 26, 1928.  
J. F. O'CONNOR  
FRICTION SHOCK ABSORBING MECHANISM  
Filed Aug. 19, 1925
1,674,872
2 Sheets-Sheet 2
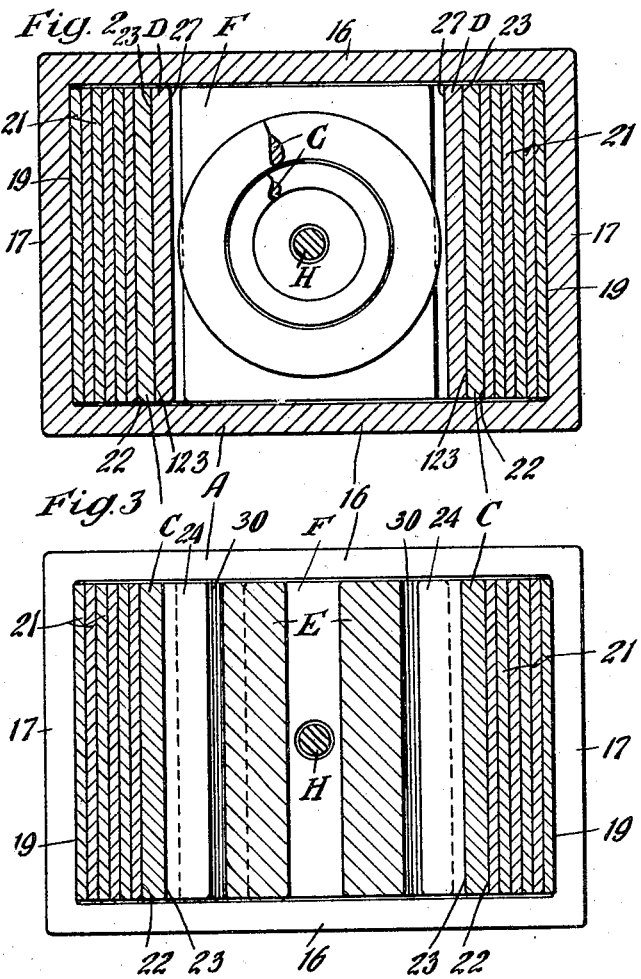

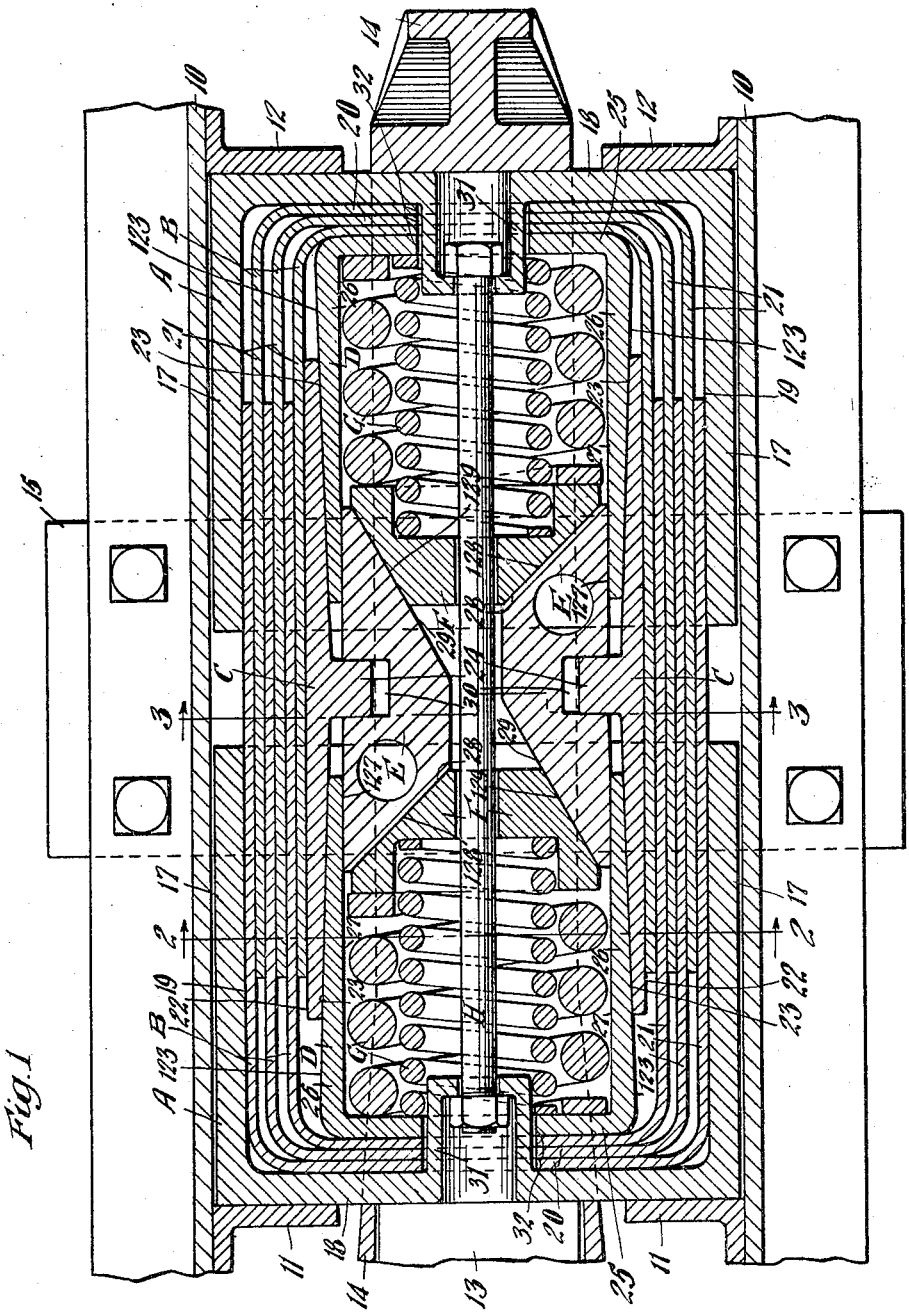

Patented June 26, 1928.

1,674,872

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 19, 1925. Serial No. 51,105.

This invention relates to improvements in friction shock absorbing mechanisms.

One object of the invention is to provide a friction shock absorbing mechanism, more particularly adapted for railway draft riggings, wherein is obtained high capacity due to large frictional areas together with differential wedge action during compression of the mechanism, and wherein is also obtained quick and certain release when the actuating force is reduced.

Another object of the invention is to provide a mechanism of the character indicated, including a plurality of plates, wherein the friction plates are so designed as to provide a certain amount of resiliency, which is effective during initial compression of the mechanism, thereby providing for preliminary light action.

Other objects and advantages of the invention will appear more clearly and fully from the description and claims hereinafter following.

In the drawings forming a part of this specification, Figure 1 is a longitudinal, horizontal, sectional view of a portion of a railway draft rigging showing my improvements in connection therewith. Figures 2 and 3 are transverse, vertical, sectional views corresponding respectively to the lines 2—2 and 3—3 of Figure 1.

In said drawings 10—10 indicate the usual channel shaped center or draft sills of a railway car underframe, to the inner sides of which are secured front stop lugs 11—11 and rear stop lugs 12—12. The inner end portion of the draw bar is designated by 13, to which is operatively connected a hooded cast yoke 14 of well-known form. The shock absorbing mechanism proper is disposed within the yoke and the yoke and parts therewithin are supported in operative position by a detachable saddle plate 15 fixed to the draft sills.

The improved shock absorbing mechanism proper, as shown, comprises broadly, a pair of front and rear follower casings A; two sets of U-shaped friction plates B—B; a pair of tapered friction elements C—C; a pair of U-shaped tapered friction members D—D; a pair of friction shoes E—E; a pair of combined spring followers and wedge blocks F—F; tandem-arranged spring resistance elements G—G; and a retainer bolt H.

The front and rear follower casings are of substantially identical design, each being in the form of a rectangular box-like casting having spaced horizontally disposed top and bottom walls 16—16, spaced vertically disposed side walls 17—17, and a transverse outer end wall 18. The end wall 18 of each casing A co-operates with the corresponding stop lugs in the manner of the usual follower. The side walls 17 of each casing have longitudinally disposed friction surfaces 19—19 on the inner sides thereof.

The U-shaped friction plates B—B are arranged in two sets at opposite ends of the mechanism, each set preferably comprising three members associated with the corresponding follower casing A. Each of the U-shaped friction plates comprises a transverse section 20 and a pair of longitudinally extending spaced arms 21—21, presenting plate-like friction members. The plate-like arms 21 of the rear set of U-shaped plates B are intercalated with the arms 21 of the front set. As shown in Figure 1, the intercalated arms on each side of the mechanism are so arranged as to provide two groups of friction elements at opposite sides of the mechanism, the outermost arms 21 of the two groups being associated with the front set of U-shaped friction plates and co-operating with the friction shells and the innermost arms of said groups being associated with the rear set of U-shaped plates and co-operating with the tapered friction elements C. In this connection, it is pointed out that due to the U-shaped contour of the friction plates D, a certain amount of resiliency is imparted to the same, thereby providing for preliminary action of the mechanism during a compression stroke.

The tapered friction elements C—C are arranged at opposite sides of the longitudinal axis of the mechanism and directly co-operate with the arms 21 at the corresponding side of the gear. The elements C are of identical design, each being in the form of a relatively heavy plate-like member having a longitudinally disposed friction surface 22 on the outer side thereof co-operating with the adjacent arm 21. On the inner side, each element C has a pair of friction surfaces 23—23, each of the friction surfaces 23 being inclined slightly with reference to the longitudinal axis of the mechanism and converging outwardly with reference to the opposed face 22 of the friction element. On the inner side, each friction element C is also provided with a lateral enlargement 24 disposed centrally between the opposite ends thereof.

The pairs of U-shaped friction members D—D are of substantially identical construction. Each of the elements D comprises a transverse section 25 and a pair of longitudinally disposed spaced arms 26—26. Each of the arms 26 is provided with an outer friction surface 123 correspondingly inclined to and adapted to co-operate with one of the friction surfaces 23 of the tapered element C at the corresponding side of the mechanism. On the inner side, each section 26 is provided with a longitudinally disposed friction surface 27.

The friction shoes E, which are two in number, are disposed at the opposite sides of the mechanism at the longitudinal center thereof. Each of the shoes E has a flat friction surface 127 at the outer side thereof adapted to co-operate with the friction surfaces 27 of the corresponding sections 26 of the front and rear U-shaped members D. On the inner side, each friction shoe has a pair of wedge faces 28 and 29, the wedge face 28 at one end of the shoe being disposed at a relatively blunt angle with reference to the longitudinal axis of the mechanism and the wedge face 29 at the opposite end of the shoe being disposed at a relatively keen wedge-acting angle with reference to the said axis. As clearly shown in Figure 1, the shoes E at the opposite sides of the mechanism are reversely arranged so that the blunt wedge face 28 of one of the shoes faces forwardly and the keen face thereof faces rearwardly, while the keen face of the other shoe faces forwardly and the blunt face thereof faces rearwardly. Each of the shoes E is slotted vertically on the outer side thereof, as indicated at 30, to receive the lug 24 of the corresponding tapered friction element C. As shown in Figure 1, a certain amount of lateral play is provided between the lug and the bottom wall of the slot 30 of each co-operating shoe and tapered friction element C, while longitudinal relative movement of these parts is prevented thereby. It will thus be evident that the friction elements C are held in properly centered relation by the shoes E.

The combined spring followers and wedge blocks F are two in number and co-operate respectively with the front and rear ends of the two friction shoes E. Each of the combined spring followers and wedge blocks has a pair of inwardly converging wedge faces 128 and 129 on the opposite sides thereof, the wedge face 128 being disposed at a relatively blunt angle to the longitudinal axis, while the wedge face 129 is disposed at a relatively keen angle to said axis. As clearly shown in Figure 1, the wedge faces 128 and 129 co-operate with the wedge faces 28 and 29 at the corresponding ends of the friction shoes E.

The spring resistance elements G—G are arranged in tandem, as most clearly shown in Figure 1, each unit comprising a relatively heavy outer coil and a lighter inner coil, the outer coil of each unit having its opposite ends bearing respectively on the outer end of the corresponding spring follower F and the transverse section 25 of the corresponding U-shaped tapered friction member D. The inner coil of each unit has one end extending into a recess provided in the corresponding spring follower and the other end thereof bearing on the transverse section 25 of the corresponding member D. The springs of each unit are held in centered relation by an inwardly extending hollow boss 31 on the wall 18 of the corresponding casing A. The transverse sections of the plates B and members D are suitably recessed, as indicated at 32, to accommodate the corresponding boss 31.

The mechanism is held in assembled relation and of uniform overall length by the retainer bolt H, which has its opposite ends anchored respectively to the bosses 31 of the front and rear follower casings. The bolt H, in addition to holding the mechanism assembled, also serves to maintain the parts under initial compression.

Compensation for wear of the various friction and wedge faces is had by the expansive action of the spring resistance elements G, which, as hereinbefore pointed out, are preferably under initial compression.

The operation of my improved shock absorbing mechanism, assuming a compression stroke, is as follows: The front and rear follower casings A will be moved relatively toward each other, carrying the corresponding sets of friction plates B therewith and also compressing the front and rear units of the tandem-arranged spring resistance elements G. Due to the pressure transmitted through the springs G, a wedging action will be set up between the combined spring followers and wedge blocks and the friction shoes, spreading the shoes apart and placing the friction elements under lateral pressure. During this action there will be a relatively high wedging action between the co-operating keen wedge faces of the spring followers and friction shoes, while there will be substantially no wedging action between the co-operating blunt wedge faces thereof. During the compression of the mechanism a differential action will be had, due to the taper of the friction elements C and the taper of the friction members D co-operating therewith, thereby effecting lateral approach toward the axis of the mechanism of the shoes E. The differential action is accommodated by slippage of the shoes on the blunt and keen faces of the front and rear spring followers F, the spring follower being squeezed out from between the shoes. During the initial compression of the mechanism, due to the resiliency of the U-shaped friction plates B, the plates will be flexed at the unsupported portions of the bends thereof until they fully bear on the end walls of the casings, thereby providing a slight preliminary action before there is any relative movement of the arms of the friction plates B on each other. The compression action of the mechanism will continue either until the actuating force is reduced or the inner ends of the casings A come into engagement, whereupon the actuating force will be transmitted directly through the casings A to the corresponding stop lugs, thereby preventing the springs G from being subjected to excessive compression. When the actuating force is reduced, the parts will all be restored to normal position by the expansive action of the springs G. Release of the mechanism is greatly facilitated due to the blunt and keen angle arrangement of the co-acting wedge faces of the spring followers and friction shoes, the included angle between the blunt and keen wedge faces of each set being such as to permit slippage on the same.

It will be evident to those skilled in the art that my invention is not limited to the blunt and keen angle arrangement of wedge faces, as it is within the scope of the invention to provide wedge faces which are all of the same angularity.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with relatively movable follower casings having interior friction surfaces; of a plurality of intercalated relatively movable friction elements, said intercalated elements being arranged in groups at opposite sides of the mechanism; means for placing said elements under lateral pressure, including wedge members interposed between said groups; a tapered friction element cooperating with each group of intercalated elements; additional, separate tapered friction members interposed between the lateral pressure creating means and each first mentioned tapered friction element; and spring resistance means opposing relative movement of said intercalated friction elements and also opposing relative movement of said follower casings.

2. In a friction shock absorbing mechanism, the combination with relatively movable follower casings having interior friction surfaces; of a plurality of intercalated relatively movable friction elements, said intercalated elements being arranged in groups at opposite sides of the mechanism and cooperating with the friction surfaces of the casings; a tapered friction element cooperating with each group of elements; friction shoes; wedge means engaging said shoes; tapered friction members interposed between each shoe and tapered friction element; and spring resistance means opposing relative movement of said intercalated elements and also opposing relative movement of said casings.

3. In a friction shock absorbing mechanism, the combination with relatively movable follower casings having interior friction surfaces; of a plurality of intercalated relatively movable friction elements, said intercalated elements being arranged in groups at opposite sides of the mechanism and cooperating with the friction surfaces of the casings; a friction member cooperating with each group of elements, said member being tapered at its opposite ends; a second friction member movable with each follower and having abutment means thereon, said last named member having inclined friction surfaces cooperating with the friction surfaces at the corresponding ends of said tapered members; wedge friction shoes cooperating with said second named members; wedge blocks engaging said shoes; and spring resistance means interposed between said wedge blocks and abutment means of the corresponding friction members.

4. In a friction shock absorbing mechanism, the combination with relatively movable follower casings having interior friction surfaces; of a plurality of intercalated friction elements, said elements being arranged in groups at opposite sides of the mechanism; of a tapered friction element cooperating with each group of elements; front and rear friction members, each of said members being movable with one of said follower casings and each of said members having inclined friction surfaces on the opposite sides thereof cooperating with the corresponding ends of said tapered elements, said members having interior longitudinally disposed friction surfaces; a set of friction shoes, each shoe cooperating with the friction surfaces of said front and rear members; wedge blocks cooperating with said shoes; and spring resistance means interposed between said follower casings and wedge blocks.

5. In a friction shock absorbing mechanism, the combination with front and rear relatively movable follower casings, each having interior friction surfaces; of a plurality of friction elements carried by each follower casing, said elements each including a pair of plate-like sections, the plate-like sections of the elements associated with the front follower casing being intercalated with the plate-like sections asscociated with the rear follower casing; a friction member at each side of the mechanism cooperating with the intercalated plate-like sections at the same side of the mechanism, each of said members being tapered at its opposite ends; a friction device movable with each follower casing, each of said devices including a pair of tapered plate-like sections disposed at opposite sides of the mechanism and cooperating with the corresponding ends of the tapered friction members; wedge spreading means cooperating with said tapered sections of said friction devices; and spring resistance means opposing relative movement of said casing.

6. In a friction shock absorbing mechanism, the combination with front and rear follower casings having interior friction surfaces; U-shaped resilient friction elements carried by each casing, said friction elements on the front and rear casings having the arms thereof intercalated; a U-shaped friction member carried by each follower casing, each of said members having tapered arms; friction shoes cooperating with said last named arms; wedge members engaging said shoes; a spring resistance interposed between each wedge member and the corresponding U-shaped friction member; and a tapered friction element at each side of the mechanism interposed between the intercalated arms of the friction elements at one side of the mechanism and the corresponding tapered arms of the U-shaped members.

7. In a friction shock absorbing mechanism, the combination with front and rear follower casings having interior longitudinally disposed friction surfaces; a group of intercalated friction plates at each side of the mechanism; a lateral pressure creating friction wedge system interposed between said groups of plates, said system including a plurality of friction shoes; differential tapered friction members interposed between said plates and shoes; spring resistance means cooperating with said lateral pressure-creating system and follower casings; and inter-engaging means on said shoes and tapered members for maintaining the latter in centered position.

In witness that I claim the foregoing I have hereunto subscribed my name this 15th day of August, 1925.

JOHN F. O'CONNOR.